US009071967B1

(12) United States Patent
Davies et al.

(10) Patent No.: US 9,071,967 B1
(45) Date of Patent: Jun. 30, 2015

(54) WIRELESS CREDENTIAL SHARING

(71) Applicant: Amazon Technologies, Inc., Reno, NV (US)

(72) Inventors: Damon Michael Davies, Seattle, WA (US); Mike Kan, Seattle, WA (US); Scott Austin Haynie, Kirkland, WA (US); Aidan Nicholas Low, Seattle, WA (US); David MacGregor Foltz, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 41 days.

(21) Appl. No.: 13/907,675

(22) Filed: May 31, 2013

(51) Int. Cl.
*H04L 29/06* (2006.01)
*H04W 12/06* (2009.01)

(52) U.S. Cl.
CPC ...................................... *H04W 12/06* (2013.01)

(58) Field of Classification Search
None
See application file for complete search history.

(56) References Cited

U.S. PATENT DOCUMENTS

| | | | |
|---|---|---|---|
| 2006/0190991 A1* | 8/2006 | Iyer | 726/3 |
| 2008/0148360 A1* | 6/2008 | Karstens | 726/4 |
| 2011/0078197 A1* | 3/2011 | Zurko et al. | 707/783 |
| 2013/0014232 A1* | 1/2013 | Louboutin et al. | 726/5 |
| 2013/0309971 A1* | 11/2013 | Kiukkonen et al. | 455/41.2 |
| 2014/0196126 A1* | 7/2014 | Peterson et al. | 726/5 |
| 2014/0223516 A1* | 8/2014 | Vongsouvanh et al. | 726/4 |

* cited by examiner

*Primary Examiner* — Jeffrey Pwu
*Assistant Examiner* — William Corum, Jr.
(74) *Attorney, Agent, or Firm* — Novak Druce Connolly Bove + Quigg LLP

(57) ABSTRACT

Various embodiments enable devices to share network authentication credentials or other information. For example, a computing device authorized to access a wireless network can be used to manage access to the wireless network, such as by modifying, sharing, or creating a password to access the wireless network. A peer-to-peer connection can be established between the authorized computing device and at least one other computing device (e.g., a guest computing device). Upon establishing the peer-to-peer connection between the devices, a service, application, or system component operating on each device can be used to share network authentication credentials between the devices. For example, the user of the authorized device can cause to be transmitted network authentication credentials to a guest computing device. When the guest computing device receives the network authentication credentials, the guest computing device can connect to the wireless network, authenticate with the wireless network using the network authentication credentials to access, and access at least one network.

19 Claims, 8 Drawing Sheets

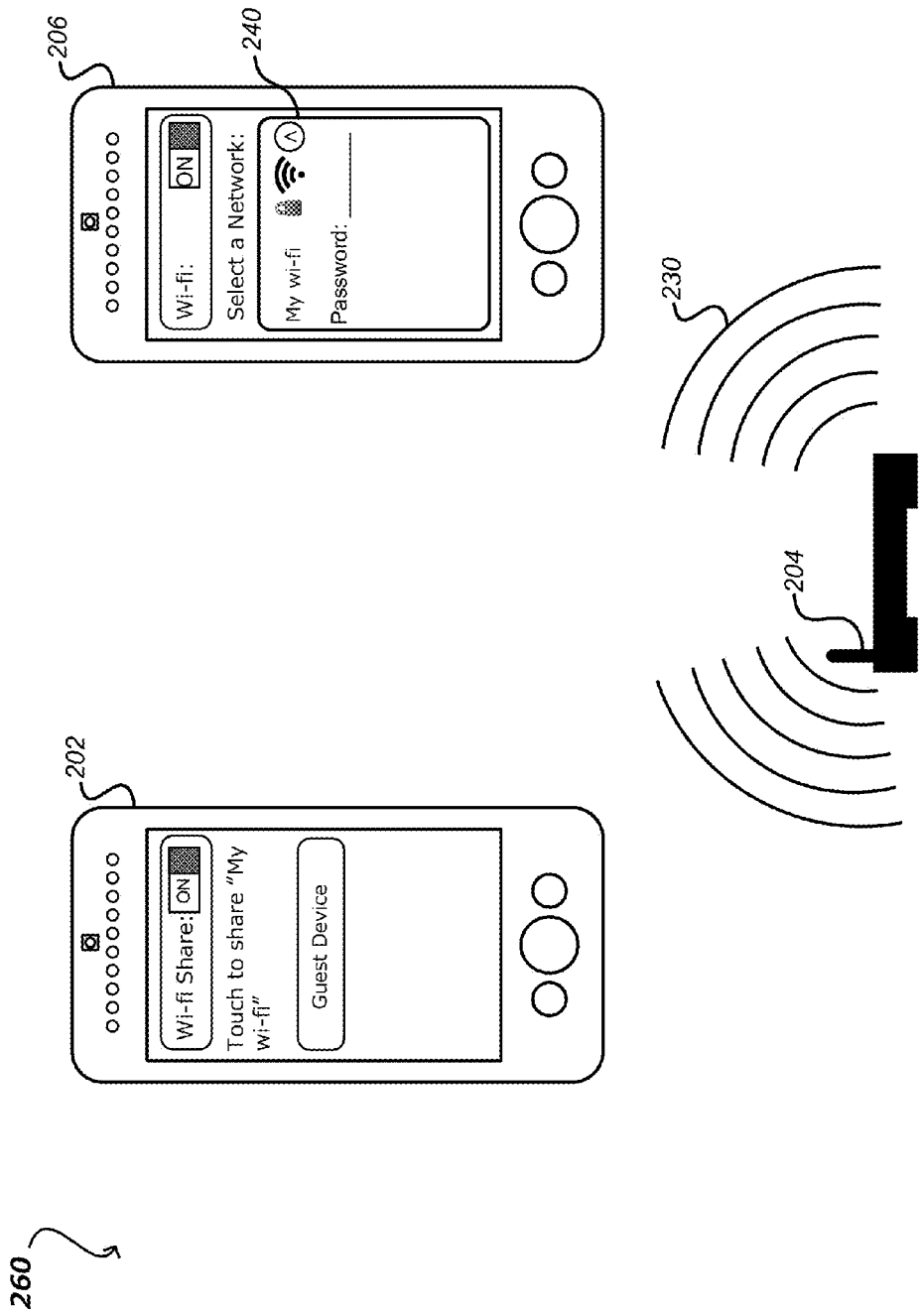

WIRELESS CREDENTIAL SHARING

BACKGROUND

People are increasingly interacting with computers and other electronic devices in new and interesting ways. For example, as an increasing variety and amount of content is being made available over networks such as the Internet, users are obtaining an increasing amount of their content over those networks. Users can access this content using any appropriate electronic device, including devices that utilize cellular-based networks or similar wireless connections. These wireless connections are often secured, where a password is used to control access to the wireless connection. The password can be provided to a user in a number of ways, such as through an electronic message (e.g., email, text message, etc.), verbally communicating the password to the user, displaying the password, for example, where the user inputs the password into their device. In many situations, however, it is desirable to provide the password to the user without the user having to input the password into their device. Further, it is desirable to limit the duration the user is granted access to the wireless network using the provided password.

BRIEF DESCRIPTION OF THE DRAWINGS

Various embodiments in accordance with the present disclosure will be described with reference to the drawings, in which:

FIGS. 2(a), 2(b), and 2(c) illustrate an example situation of providing network authentication credentials to a computing device in accordance with various embodiments;

DETAILED DESCRIPTION

Figure 1:
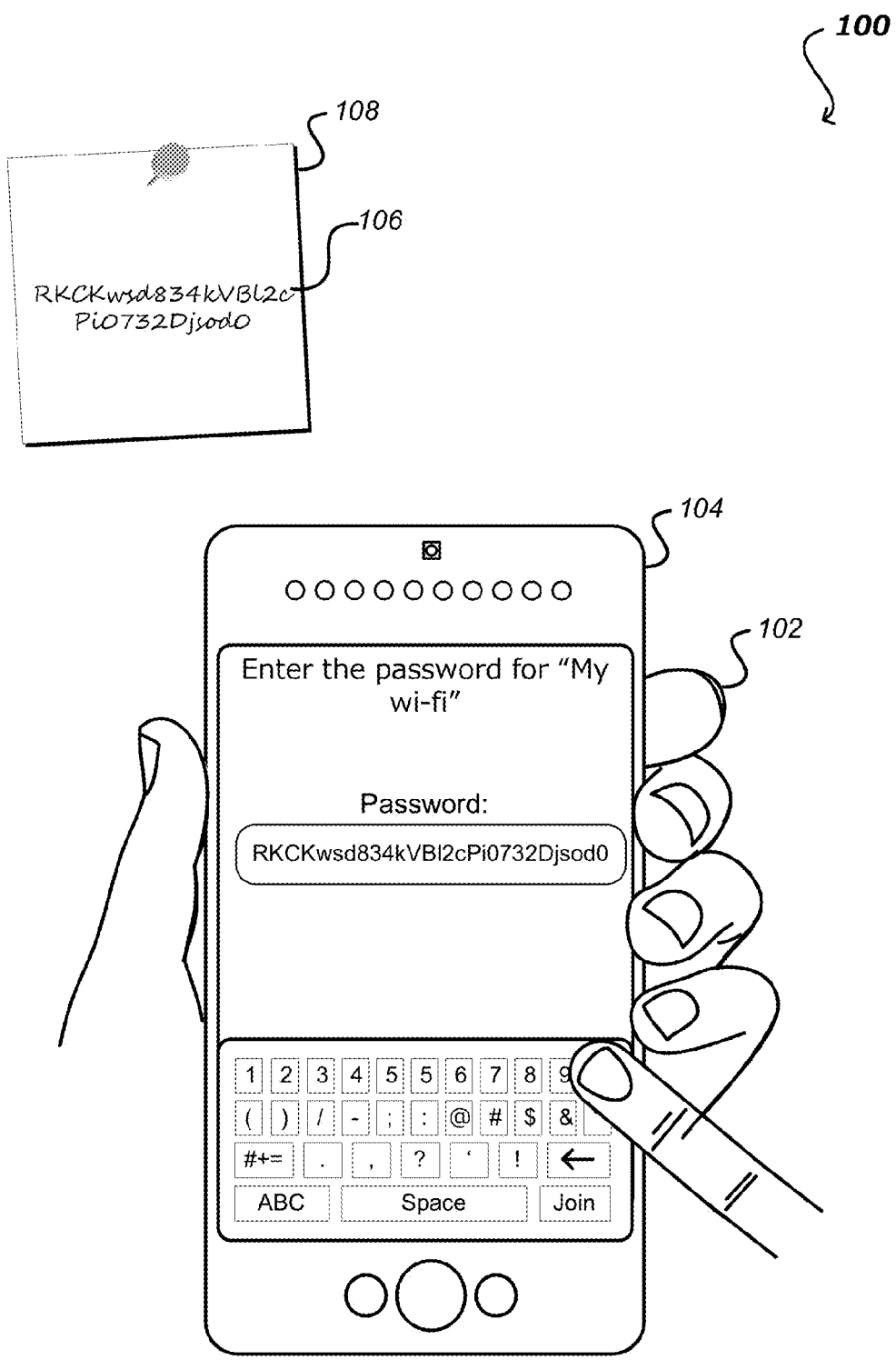
FIG. 1 illustrates a user inputting network authentication credentials into a computing device to access a network in accordance with various embodiments.

Systems and methods in accordance with various embodiments of the present disclosure may overcome one or more of the aforementioned and other deficiencies experienced in conventional approaches for providing security information to an electronic device. In particular, various embodiments enable devices to share network authentication credentials or other secure information between devices. For example, a computing device (e.g., a mobile phone, tablet computer, etc.) can create a wireless personal area network or other connection to connect with one or more other computing devices using wi-fi direct, Bluetooth, or some other peer-to-peer network technology. The computing device can manage access to a router or other such device of a wireless network such as by being used to modify, share, and/or create a password to access the wireless network.

A peer-to-peer network connection can be established between the device (also referred to as the authorized device) and at least one other computing device (e.g., a guest computing device). Upon establishing the peer-to-peer network connection between the devices, a service, application or system component operating on each device can be used to share network authentication credentials between the devices. For example, a user of the authorized device can select a guest computing device to receive the network authentication credentials. In doing so, the user of the authorized device can specify at least one wireless network managed by the authorized device and can limit the duration of access to the specified wireless network. The authorized device can then transmit the network authentication credentials to the guest computing device. When the guest computing device receives and accepts the network authentication credentials, the guest computing device can connect to the wireless network and can authenticate with the wireless network using the network authentication credentials. In the situation where an amount of time was specified during which the guest computing device can access the wireless network, the guest computing device can access the wireless network for the specified amount of time. At the expiration of the specified amount of time, the guest computing device is disconnected from the wireless network and at least one copy of the network authentication credentials are deleted from the guest computing device. Various other applications, processes, and uses are presented below with respect to the various embodiments.

As mentioned, electronic devices can access content on the Internet by connecting to a wireless network. In many situations, the wireless network is often secured and network authentication credentials (such as a password) are required to access the wireless network. For example, wireless local area networks ("WLAN") found in a person's home, coffee shop, airport, hotel, library, among other locations, can be protected by a password. The strength of the password can be a function of length, complexity, and unpredictability of the characters used to create the password. A relatively weak or simple password (such as the word "password"), although easy to input and remember, can be a security risk because such a password can be guessed (e.g., by a person or software configured to determined such passwords). Using strong passwords can lower overall security risk, but strong passwords can be difficult to input and/or remember. In any situation, the password can be provided to a user in a number of ways, such as through an electronic message (e.g., email, text message, etc.), verbally communicated (e.g., speaking the password to the user), privately or publically displayed (e.g., displaying the password on a display medium), among others, where upon receiving the password the user inputs the password into their device to access the wireless network.

For example, as shown in example 100 of FIG. 1, a user 102 is attempting to authenticate an electronic device 104 to a wireless network using a provided network authentication password. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, portable media players, and wearable computers (e.g., smart watches, augmented reality glasses) among others.

In this example, the user selects the wireless network (i.e., "My wi-fi") to which the user intends to connect and is prompted to enter a password to access the selected wireless network. As described, the password can vary in complexity and can be provided to the user in a number of different ways. In this example, the password 106 has been written on a sticky note 108 and made available to the user. The user can enter the password into their device, taking care not to input the wrong characters. Upon entering the password, the device can access the wireless network. In many situations, however, it is desirable to provide the password to the user without the user having to manually input the password into their device where mistakes can be made entering the password and without the owner of the password having to provide the password to each user desiring access. Further, it is desirable to limit the duration of access to the wireless network.

Figure 2A:
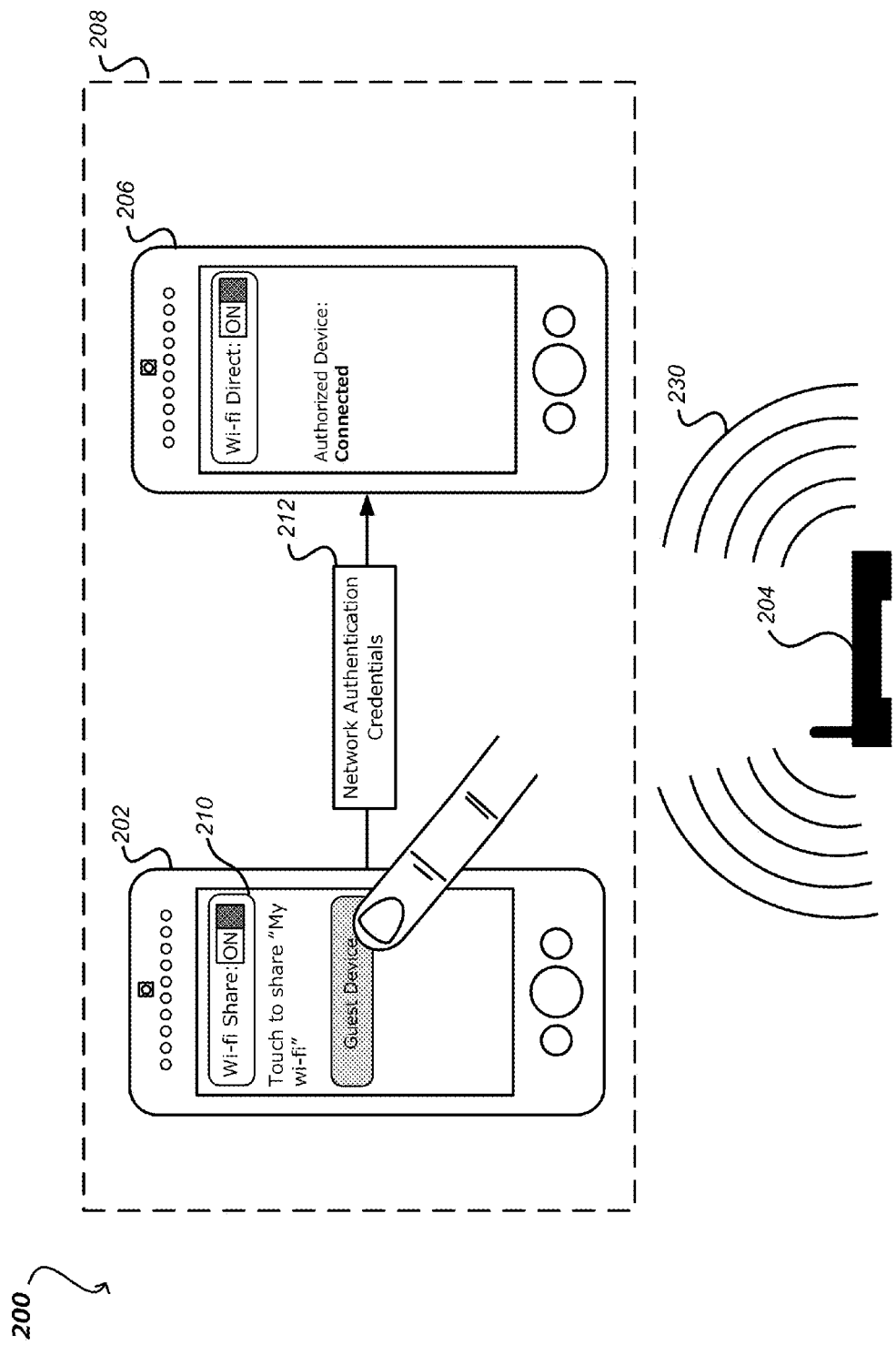
Figure 2B:
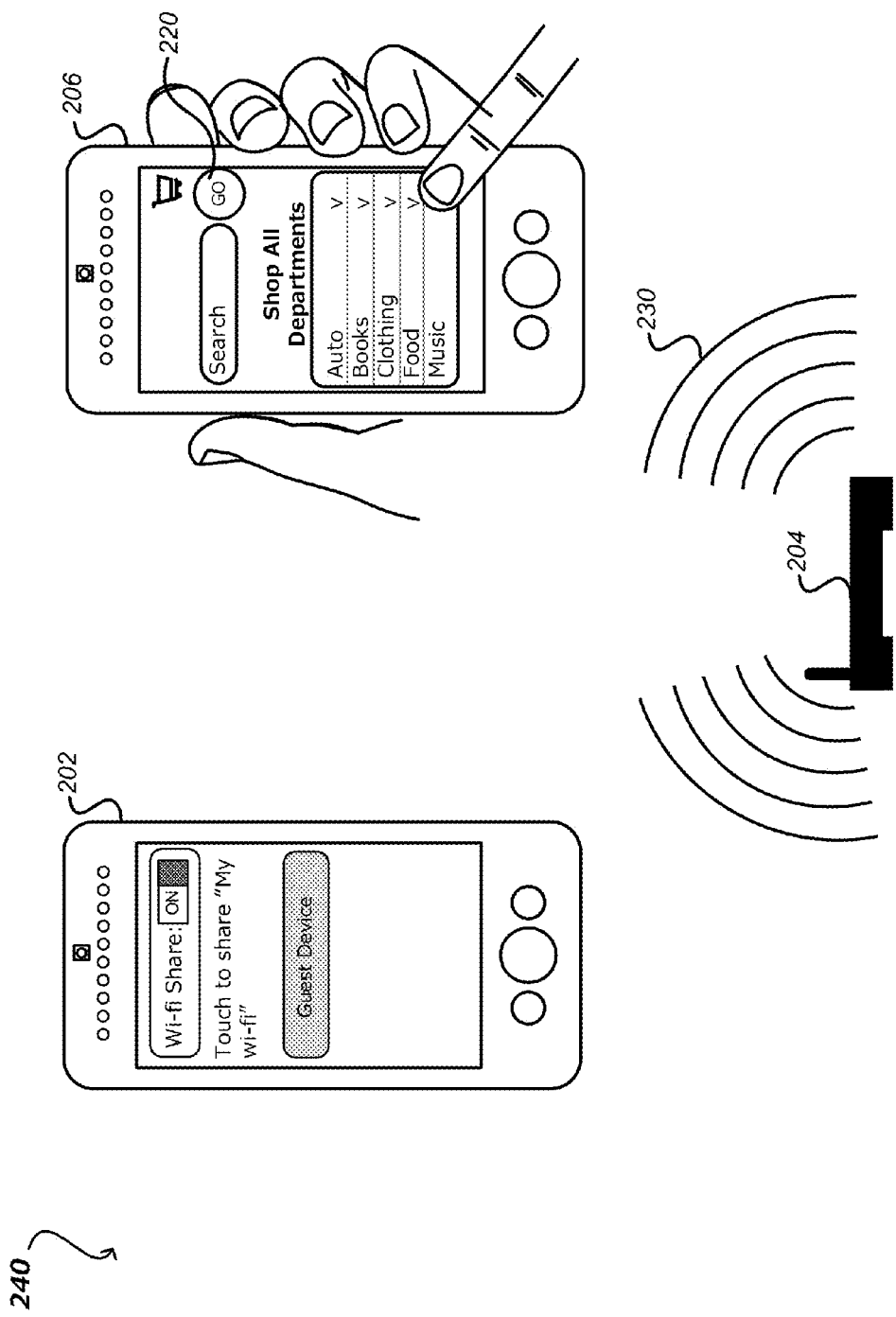

FIGS. 2(*a*), 2(*b*), and 2(*c*) illustrate an example situation of providing network authentication credentials to a computing device in accordance with various embodiments. As illustrated in example 200 of FIG. 2(*a*), an authorized computing device 202 is connected to a router 204 or other such device of a wireless network 230 and can be used to manage access to the wireless network. For example, the authorized device can be used to modify, share, and/or create a password to access the wireless network. A guest computing device 206 would like access to the wireless network. As described, the user of the guest computing device can be provided the password to access the wireless network in a number of ways (i.e., by word of mouth, keying the password into the device by the authorized user or guest user, etc.). In accordance with various embodiments, an authorized computing device or service can share network authentication credentials with one or more guest computing devices for one or more networks over a peer-to-peer connection or other network connection to provide access to a particular wireless network.

For example, the authorized computing device can create a wireless personal area network (such as a wi-fi direct network, a Bluetooth network, a near field communication (NFC) network, etc.) 208 to connect with one or more other computing devices (i.e., guest computing devices) within vicinity of the authorized computing device. As shown in FIG. 2(*a*), the guest computing device has established a peer-to-peer connection with the authorized computing device over wi-fi direct. As used herein, an authorized computing device refers to a computing device authorized to manage, share, and/or create network authentication credentials for a wireless network. Also as used herein, a guest computing device is a computing device with which the network authentication credentials are shared. In some embodiments, the guest computing device is not permitted to reshare network authentication credentials, while in various embodiments, the network authentication credentials can be shared with other devices by the guest computing device. For example, when sharing the network authentication credentials by the authorized computing device to one or more guest computing devices, the authorized computing device can set one or more preferences associated with the network authentication credentials. One such preference can allow for the sharing of the network authentication credentials by a guest computing device with other computing devices (herein referred to as reshare preferences). Another such preference can limit the number of other computing devices to which the guest computing device can share the network authentication credentials. For example, the guest computing device may be able to share the network authentication credentials with three devices, while in other situations, the guest computing device may be able to share the network authentication credentials with an unlimited number of computing devices. Other preferences can be set, such as a preference that allows the devices that have been shared the network authentication credentials by the guest computing device to also share the network authentication credentials with other devices, where the number of shares is set by the authorized computing device, or is otherwise based on a default value.

Upon establishing the peer-to-peer connection between the devices, a service, application, or system component operating on each device can be used to share network authentication credentials between the devices. For example, an application (e.g., a "Wi-fi Share" application) 210 running on the authorized device can display a list of devices within the vicinity of the authorized device, and a user operating the authorized device can select one or more devices to share the network authentication credentials with. It should be noted that in many embodiments, the application is in communication with a system component of the device having access to system level resources, including access to password controls, network settings, and various other device settings.

For at least a subset of the selected devices, one or more preferences can be set to limit the duration of access and/or access to the wireless network. The preferences can include a time-to-live (TTL) value, reshare preferences, a data transfer limit, among others values. The TTL value can indicate a maximum amount of time that a device is permitted to access the wireless network. The reshare preferences can indicate whether a device is permitted to share the network authentication credentials with other device. Additionally, the reshare preference can indicate a limit to the number of other devices to which the network authentication credentials can be shared. The data transfer limit can limit an amount of data that can be transferred by the device. In various situations, the amount of data can be updated, such as increased or decreased. Certain events can trigger increased data access, such as, making a purchase of a product or service (or for additional data), and in response to the purchase, receiving an update to the data transfer limit.

The preferences can be set before selecting the devices, such as through an application settings interface of the application, or set for each device at the time the device selected. Alternatively, a set of default preferences can be used. For example, the default TTL value can be six hours and the reshare preferences can be set to none. The application, service, or system component operating on each of the selected guest computing devices can be used to enforce the preferences, disconnect from the wireless network, delete network authentication credentials at an expiration of the TTL value, and/or authenticate the selected guest computing devices to the wireless network, among other functions.

Continuing with FIG. 2(*a*), a user of the authorized device selects a guest computing device to receive the network authentication credentials. Upon selecting the device, the user of the authorized device can be prompted to specify at least one wireless network managed by the authorized device, an amount of time the guest computing device can access the specified wireless network (e.g., a TTL value), whether the guest computing device can reshare the network authentication credentials (e.g., reshare preferences), etc. The authorized device can then transmit the network authentication credentials 212 to the guest computing device. In some embodiments, the network authentication credentials can be encrypted under one or more encryption algorithms, while in other embodiments, the network authentication credentials are sent as plaintext. Encrypting the network authentication credentials can be performed using symmetric cryptography (e.g., shared secret key), asymmetric cryptography (e.g., public-key and private-key), or other forms of encryption. In symmetric cryptography schemes, the encryption and decryption keys are the same. Thus communicating parties must agree on a secret key before they wish to communicate. In asymmetric cryptography schemes, the public encryption key is published for anyone to use and encrypt messages. However, only the receiving party has access to the private decryption key and is capable of reading the encrypted messages. In various other embodiments, in addition to (or instead of) encrypting the data passing between the devices, the frequency channel or medium of communication can be encrypted, such as by using wired equivalent privacy (WEP), wi-fi protected access (WPA and WPA2), or some other encryption.

When the guest computing device receives the network authentication credentials, the guest computing device can connect to the wireless network and can authenticate with the wireless network using the network authentication credentials. In many situations, the authorized device is within the vicinity of the guest computing device during the time the guest computing device connects to the wireless network; however, in some situations the authorized device is not present during the time the guest computing device connects to the wireless network. In such a situation, the guest computing device's connection to the wireless connection is not disrupted, and the guest computing device can continue to access the wireless network to the extent authorized regardless of the authorized computing devices presence. In the situation where an amount of time was specified, the guest computing device can access the wireless network for the specified amount of time. For example, as shown in example 240 of FIG. 2(*b*), the guest computing device was authenticated to the wireless network 230 and can, for example, utilize a web browser 220 running of the device to access the Internet to access one or more Internet provided resources, such as an online store for at least the specified amount of time. It should be noted that the computing device can be used to perform any number of activities supported by the wireless network, such as video conferencing, peer-to-peer communication (e.g., email, instant messaging, VoIP, etc.), among other Internet supported network activities.

In the situation where the guest computing device is granted reshare preferences, the guest computing device can share the network authentication credentials with other computing devices during at least the amount of time indicated by the TTL value. For example, the guest computing device may be able to share the network authentication credentials with three devices, while in other situations, the guest computing device may be able to share the network authentication credentials with an unlimited number of computing devices during the time indicated by the TTL value. In various embodiments, the sharing device cannot share any more access than the access the sharing device has been granted. At the expiration of the specified amount of time, the application, service, or system component operating on the guest computing device disconnects the device form the wireless network and deletes at least one copy (and in many situations all copies) of the network authentication credentials. Thereafter, the guest computing device can no longer access the wireless network because the guest computing device does not have the network authentication credentials required to be authenticated into the wireless network. For example, as shown in example 260 of FIG. 2(*c*), the TTL value has expired. The application, service or system component operating on the guest computing device determines that the TTL value has expired. A number of approaches can be implemented to determine that the TTL value has expired. For example, the system component operating on the guest computing device can check the TTL value to determine whether the TTL value has expired each time a data packet is transmitted from the guest computing device. In other embodiments, the system component can be configured to determine whether the TTL value has expired after a predetermined number of data packets have been transmitted or at the expiration of a predetermined period of time. In various other embodiments, an event timer, system watch clock, or other such system component can be set to expire at an expiration of the TTL value, where the system component can be configured to disconnect the guest computing device from the network and delete at least one copy of the network authentication credentials upon receiving an indication of the expiration of the event time. When the application determines that the TTL value has expired, the service deletes the network authentication credentials from the guest computing device. The guest computing device can then no longer be authenticated, and thus, can no longer access the wireless network. If the user of the guest computing device attempts to connect to the wireless network, the user is prompted to input the password of the wireless network through a network connection interface 240. Alternatively, the network authentication credentials can also be sent to the guest computing device as described above. Thereafter, the guest computing device can connect to the wireless network and access the Internet or another network as provided by the router providing the wireless network. It should be noted that the operations performed by the authorized computing device can be performed by a service or software program separate from the authorized computing device. The service can be configured to provide access to one or more devices based on a policies and/or rules provided to the service, where the polices and/or rules can be modified to account for different situations. The service can reside on the router providing the wireless network, or some other device, such as a remote server that can manage access by communicating directly with the guest computing devices, or with a device in communication with the guest computing devices (such as the router). In some situations, access to the wireless network is controlled by the router, where the router is configured to perform the various actions of the authorized device. Various other applications, processes, and uses known to one skilled in the art are considered herein, and the various embodiments described are not to be taken as limiting.

Figure 3:
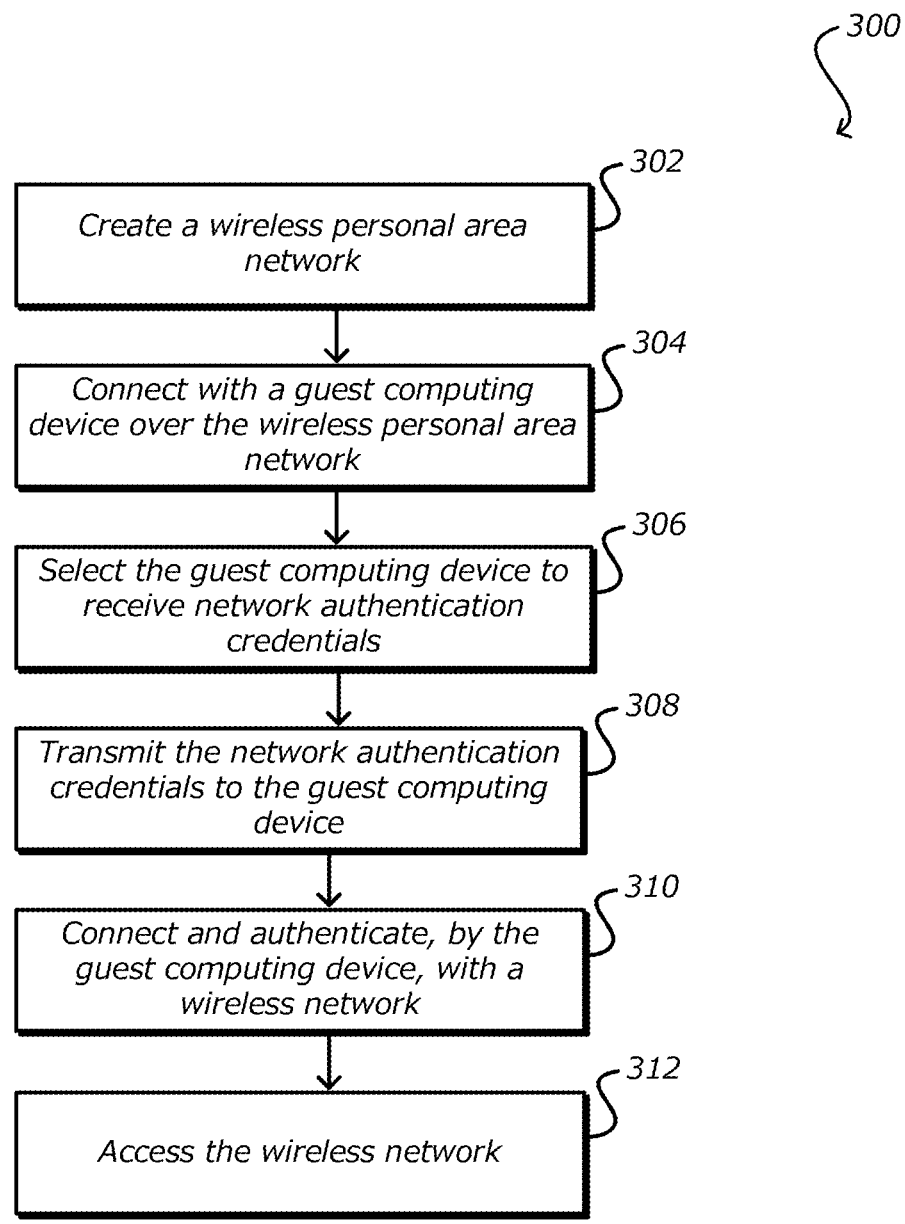
FIG. 3 illustrate example process for providing network authentication credentials to a computing device in accordance with an embodiment.

FIG. 3 illustrates an example process for providing network authentication information to a computing device in accordance with an embodiment. It should be understood that, for any process discussed herein, there can be additional, fewer, or alternative steps performed in similar or alternative orders, or in parallel, within the scope of the various embodiments unless otherwise stated. As mentioned above, electronic devices (e.g., a mobile device, tablet computer, etc.) can access content on the Internet by connecting to at least a wireless network. In many situations, the wireless network is secured and network authentication credentials (such as a password) are required to access the wireless network. The user can enter the password into their device and upon entering the password, the device can access the wireless network. In many situations, however, it is desirable to provide the password to the user without the user having to input the password into their device where mistakes can be made during entry of the password and/or without the owner or other authorized user in control of the password providing the password to each user desiring access. Accordingly, in accordance with various embodiments, an authorized computing device or service can share network authentication credentials to one or more guest computing devices for one or more networks over a peer-to-peer network to provide access to a particular wireless network. The access can be limited in time, duration, or by some other approach.

As described, a computing device (e.g., an authorized computing device) connected to a wireless network can be used to manage access to the wireless network by, for example, being used to modify, share, and/or create a password to access the wireless network. For example, the authorized computing device can create 302 a wireless personal area network (such as a wi-fi direct network, a Bluetooth network, a near field communication (NFC) network, etc.) to connect 304 with one or more other computing devices (i.e., guest computing devices) within vicinity of the authorized computing device. Upon establishing the wireless personal area network between the devices, a service, application, or system component operating on each device can be used to share network authentication credentials between the devices. For example, an application (e.g., a "Wi-fi Share" application) running on the authorized device can display a list of devices within the vicinity of the authorized device, and a user operating the authorized device can select 306 one or more computing devices (e.g., guest computing devices) to receive the network authentication credentials. The application, service, or system component operating on each of the selected guest computing devices can be used to enforce the preferences, delete the network authentication credentials, and authenticate the selected guest computing devices to the wireless network, among other functions.

Upon selecting at least one device, the user of the authorized device can be prompted to specify at least one wireless network managed by the authorized device, an amount of time or other setting to limit access to the wireless network (e.g., a TTL value, a data transfer limit, etc.), whether the guest computing device can reshare the network authentication credentials (e.g., reshare preferences), among other preferences. Alternatively, the preferences can be set before selecting the devices, such as through an application settings interface of the application, or set for each device at the time the device selected. If no preferences are set, a set of default preferences can be used. The authorized device then transmits 308 the network authentication credentials to the guest computing device. In some embodiments, the network authentication credentials are encrypted under one or more encryption algorithms, while in other embodiments, the network authentication credentials are sent as plaintext. When the guest computing device receives the network authentication credentials, the guest computing device can accept the network authentication credentials, connect and authenticate 310 with the wireless network using the network authentication credentials. In the situation where the credentials are encrypted, the application or service running on the device first decrypts the network authentication credentials. In any situation, the credentials can be maintained in a secure storage medium of the device, where only the application or service can access the credentials. Requests or operations that use the credentials are made at least through the application (e.g., the Wi-fi share application). For example, the application can provide the network authentication credentials to a network service or component to authenticate into the wireless network. Thereafter, the guest computing device can utilize a web browser (or other application) to access 312 at least one network such as the Internet provided by the wireless network to, for example, access an online store or perform any number of activities supported by the wireless network (e.g., video conferencing, instant messaging, using VoIP, etc.), or other Internet supported activities.

It should be noted that the embodiments described herein can be implemented in a number of different environments or upon the occurrence of one or more events. For example, any computing device or service with management capabilities over a network (e.g., wired or wireless) that requires network authentication credentials to access the network can share the network authentication credentials with one or more other computing devices for at least one networks over a peer-to-peer network (or other network). For example, an authorized computing device or service can be used to automatically "push" network authentication credentials to one or more devices (e.g., guest computing devices) when certain events occur. In accordance with various embodiments, examples of such events can include; checking into a hotel; purchasing an item at a store (e.g., a cup of coffee from at a coffee shop); checking into an airport; entering into a public library, a work environment, school, hospital, among other locations. In these situations, entering into a particular location or performing a determined action at one of these locations (e.g., making a purchase, checking in to an establishment, etc.), can result in network authentication credentials automatically being transmitted or "pushed" to the guest computing device.

For example, a guest operating device can have operating thereon an application, service, or system component configured to receive network authentication credentials. An establishment, such as a public library can include an application or service configured to automatically transmit network authentication credentials to certain devices detected within a determined vicinity of the public library, where the network authentication credentials are capable of being used by the receiving device to access at least one wireless network. When a registered device (or in some situations any device with appropriate software, services, or system components operating thereon) is detected, the network authentication credentials can be automatically transmitted to the guest computing device. Thereafter, the guest computing device can connect to a wireless network using the provided network authentication credentials. In another example, the establishment can be a coffee house, restaurant, store, or any establishment that provides wireless network access. The wireless network can be secured by a password or other network authentication credential and the establishment can have a service operating that transmits the network authentication credentials when a purchase is made. For example, the service operating at the coffee house can be configured to detect devices near the cash register, or other area where a purchase is made. The service can detect the device of a person making a purchase and can transmit the network authentication credentials to the device. In other situations, a user of a device can gain access to a wireless network by scanning a bar code, QR code, or any code, where scanning the code can provide the user access to a particular wireless network for a predetermined amount of time or for a predetermined amount of data use. In various situations the code can be used once, and at the expiration of such use the user is disconnected from the wireless network. Such an approach can also be used with various tap-to-pay systems, where a user of a device "taps" their device to pay for a transaction. In this situation, in addition to paying for the transaction the user can be provided access to a wireless network for at least some period of time or data limit.

As described, the access can be limited in time, where the authorized user can set a time-to-live (TTL) value for a guest user's session that indicates an amount of time the guest computing device can access the specified wireless network. The TTL value can be for any period of time, such as a fixed time or a time based on the duration of an event or situation. For example, the TTL value can be based on the duration of a concert, networking event, meeting, etc., where the TTL value is set to allow network access as long as the event is in session. In another example, the TTL value can be set for a fixed time, such as a few hours. In yet another example, the TTL value can be set for the length of what the situation requires, such as the length of a hotel booking, where the TTL value is based on the number of days a user stays at the hotel.

In some situations, it can be desirable to automatically update the TTL value. Accordingly, certain events can automatically provide an updated TTL. In this situation, information to update the TTL value for these devices can be automatically transmitted to these devices or the devices can periodically request for an updated TTL value. Events to trigger such an update can include maintaining a continuous connection to the wireless network, making a purchase for continued access to the wireless network, among others, where when the event is detected information to update the TTL value can be transmitted. Thereafter, the device can access the wireless network until the expiration of the updated TTL value. Such approaches similarly apply to other settings configured to limit access to the wireless network, such a data limit.

Figure 4:
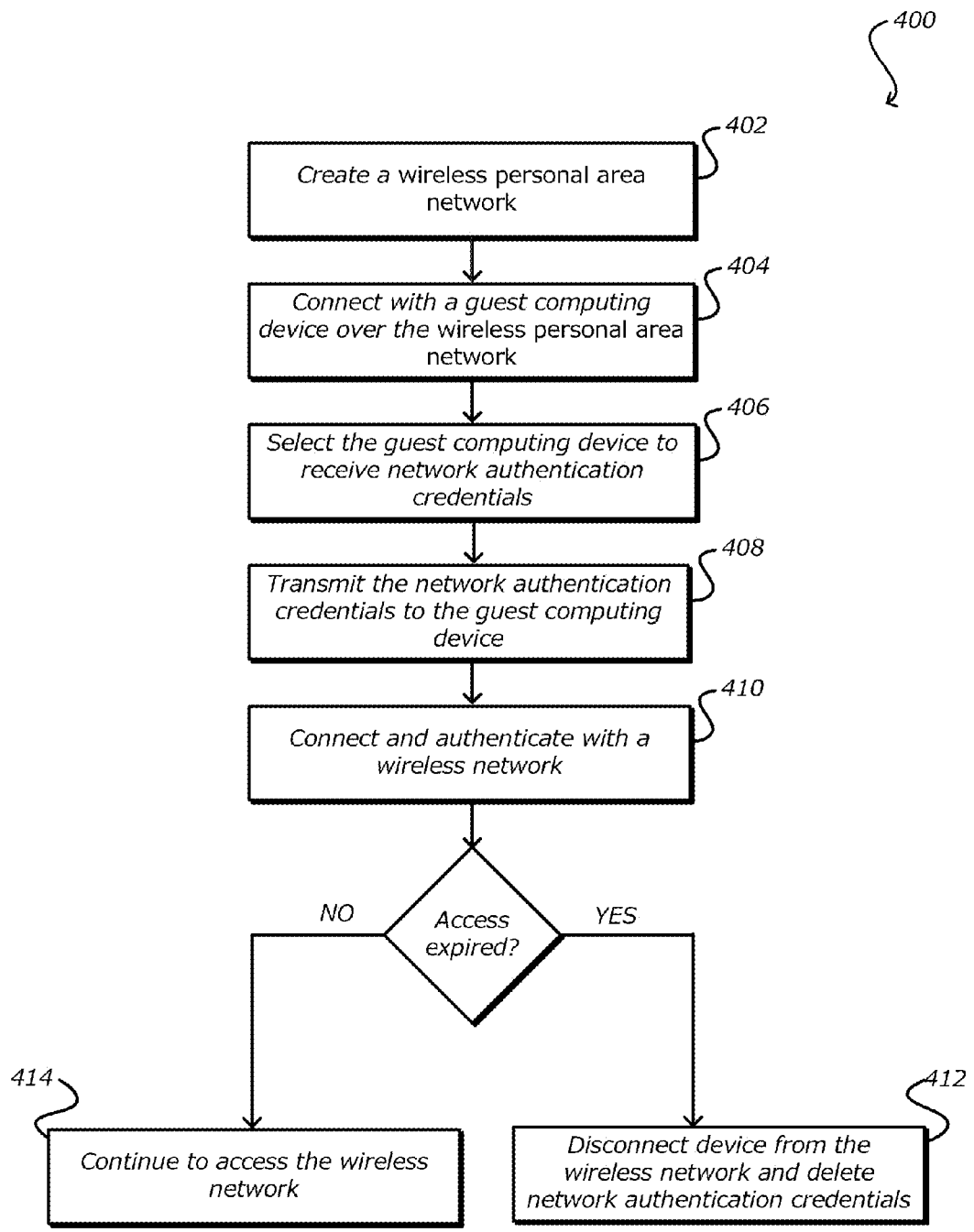
FIG. 4 illustrates an example process for providing network authentication credentials to a computing device in accordance with an alternate embodiment.

FIG. 4 illustrates another example process 400 for providing network authentication information to a computing device in accordance with various embodiments. As with the prior example, the authorized computing device can create 402 a wireless personal area network (e.g., peer-to-peer network) to connect 404 with one or more other computing devices (i.e., guest computing devices) within vicinity of the authorized computing device. Upon establishing the peer-to-peer connection between the devices, a service or other application running on each device can be used to share network authentication credentials between the devices. A user operating the authorized device selects 406 at least one guest computing device to receive the network authentication credentials. The authorized device then transmits 408 the network authentication credentials to the guest computing device. In some situations, the receiving device is prompted to accept the network authentication credentials, while in other situations the network authentication credentials are automatically accepted. Upon accepting the network authentication credentials, the guest computing device connects and authenticates 410 with the wireless network using the network authentication credentials.

As described, it can be desirable to limit the amount of time a device is allowed access to the wireless network. For example, the authorized device can be used to set a time-to-live (TTL) value for the guest user's session that indicates an amount of time the guest computing device can access the specified wireless network, and the application running on each of the selected guest computing devices can be used to enforce the TTL value by disconnecting the guest computing device and deleting the network authentication credentials at an expiration of the TTL value. For example, when the system component on the guest computing device determines 412 that access to the wireless network has expired, such as by determining that the TTL value has expired, the component can disconnect the device from the wireless network and delete at least one copy of the network authentication credentials from the device. A number of approaches can be implemented to determine that the TTL value has expired. For example, the system component can determine whether the TTL value has expired each time a data packet is transmitted from the guest computing device, after a predetermined number of data packets are transmitted, or at the expiration of a predetermined period of time. Further, as described, a data transfer limit can be set to limit the duration of access to the wireless network. Further still, in various embodiments, the authorized device can revoke access to the wireless network to any device having received the network authentication credentials at any time, regardless of a TTL value or any other wireless network connection limitation provided to that device. In some situations, the wireless network may only support a predetermined number of devices, where devices can be selectively removed as devices are provided access to the wireless network. For example, at any given time, twenty five devices may be provided access to the wireless network, and when a twenty sixth device is provided access, the first device of the twenty six devices can be caused to be disconnected from the wireless network. In other embodiments, at least a subset of connected devices can be disconnected from the wireless network if the network authentication credentials are modified, such as by being changed, while in other approaches the modified network authentication credentials can be pushed to all connected devices. In the situation where the credentials are modified and are not pushed or otherwise provided to any connected device, the guest computing device can no longer be authenticated (since the device does not have a copy of the correct network authentication credentials) by the wireless network, and thus, can no longer access the wireless network. If the user of the guest computing device attempts to connect to the wireless network, the user is prompted to input the password of the wireless network. Alternatively, the network authentication credentials can also be sent to the guest computing device using any of the approaches described herein. Thereafter, the guest computing device can connect to the wireless network and can access the Internet or other network provided by the wireless network. When it is determined 414 that the TTL value has not expired, the guest computing device can continue to access the wireless network.

Figure 5:
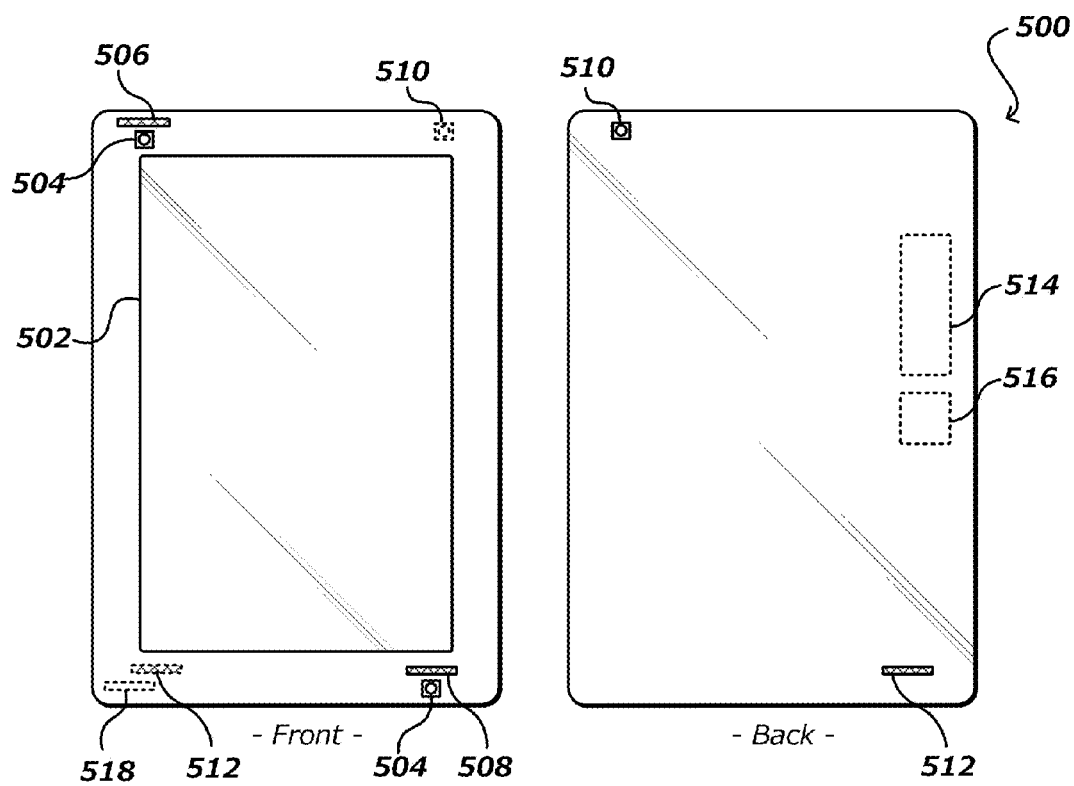
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device).

Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
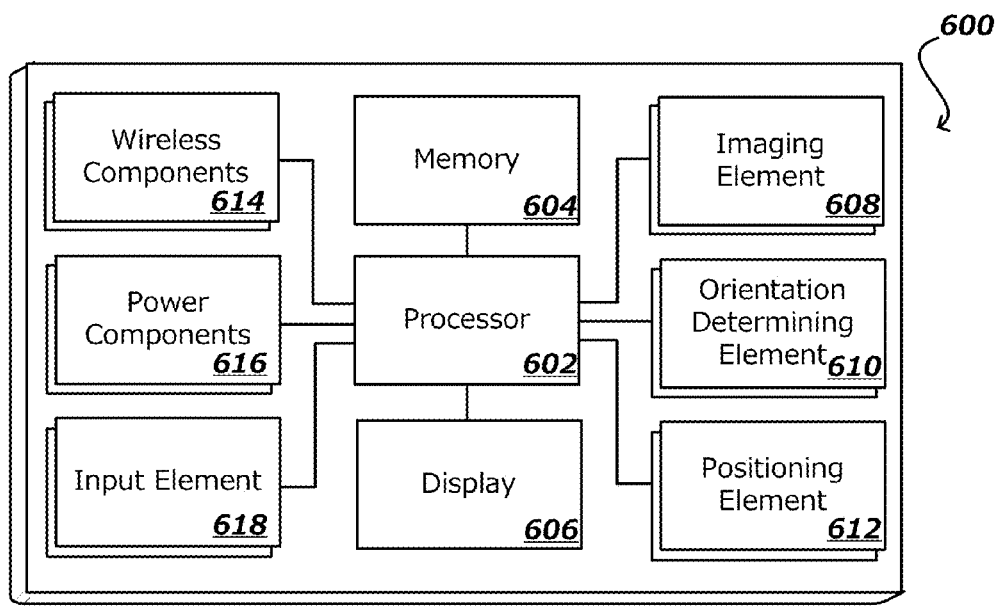
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
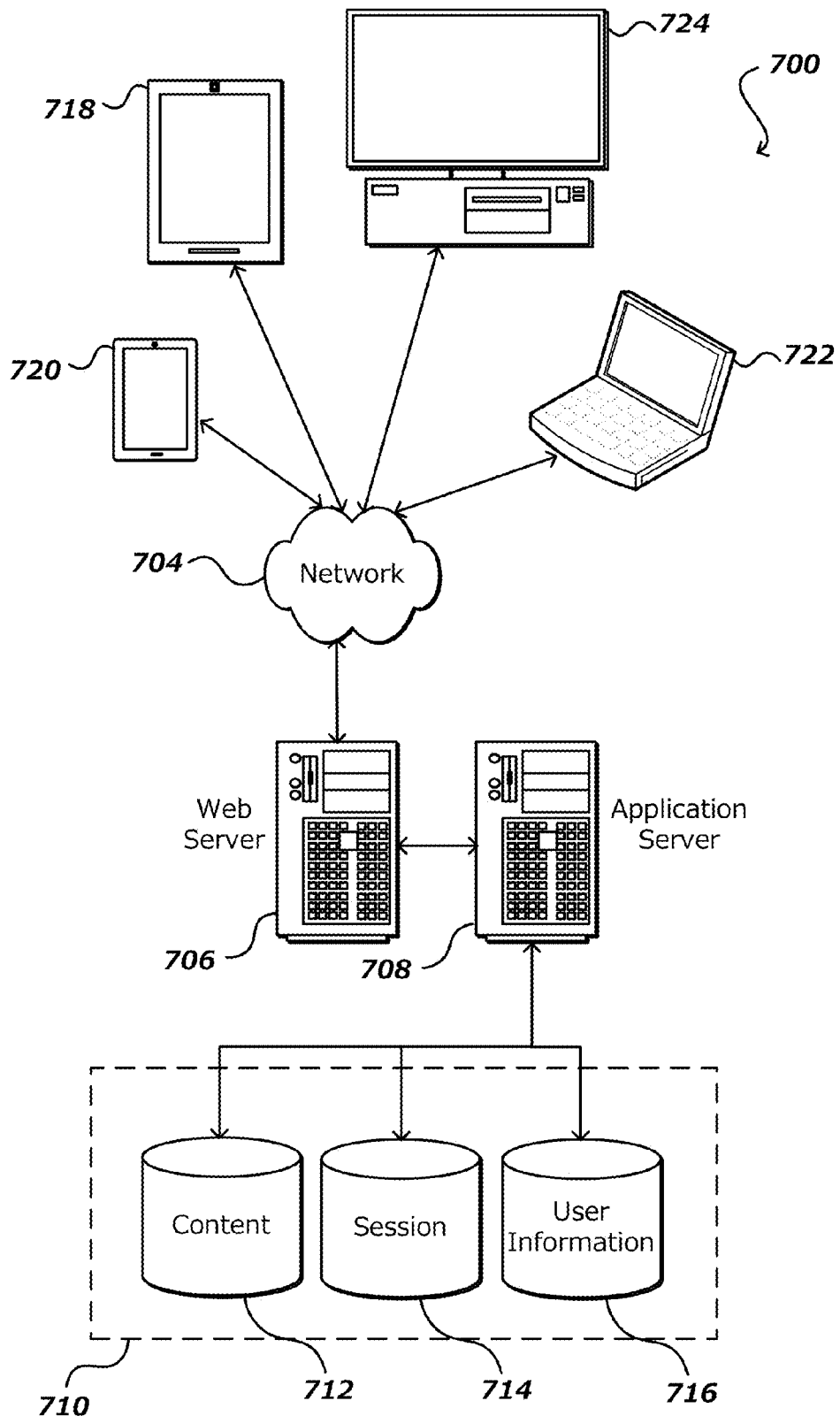
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause a computing device to:
   detect a plurality of guest computing devices within a vicinity of the computing device;
   receive, on an interface of the computing device, a selection of a guest computing device from the plurality of guest computing devices;
   establish a peer-to-peer connection between the computing device and the selected guest computing device;
   transmit network authentication credentials over the peer-to-peer connection to the selected guest computing device, the network authentication credentials including a reshare preference and enabling access to a wireless network, the reshare preference indicating that the selected guest computing device is permitted to share the network authentication credentials with a predetermined number of other computing devices, the selected guest computing device configured to:
   receive the network authentication credentials that include the reshare preference,
   automatically connect to the wireless network by authenticating with a router using the network authentication credentials,
   establish a peer-to-peer connection with at least one other guest computing device, and
   share the network work authentication credentials with the at least one other guest computing device based at least in part on the reshare preference.

2. The computing device of claim 1, wherein transmitting the network authentication credentials to the guest computing device further comprises:
   transmitting a time-to-live (TTL) value to the selected guest computing device, wherein the TTL value indicates a maximum amount of time that the selected guest computing device is permitted to access the wireless network.

3. The computing device of claim 2, wherein upon receiving the network authentication credentials at the selected guest computing device, the selected guest computing device is configured to:
   determine that the TTL value is expired;
   disconnect access to the wireless network; and
   delete the network authentication credentials.

4. A computer implemented method, comprising:
  establishing a connection with a first computing device by a second computing device;
  receiving network authentication information at the second computing device from the first computing device, the network authentication information including a reshare preference, wherein the first computing device transmits the network authentication information in response to a selection being received at the first computing device to send the network authentication information to the second computing device, the reshare preference indicating that the second computing device is permitted to share the network authentication credentials with a predetermined number of other computing devices, the second computing device configured to:
    connect to a network using the network authentication information,
    establish a peer-to-peer connection with at least one other guest computing device, and
    share the network work authentication information with the at least one other guest computing device based at least in part on the reshare preference.

5. The computer implemented method of claim 4, wherein the first computing device includes a first application and the second computing device includes a second application, the first application being used to share the network authentication information with the second application on the second computing device.

6. The computer implemented method of claim 5, wherein the first application is used to specify at least one network managed by the first computing device, a time-to-live (TTL) value, or one or more reshare preferences, and wherein the second application is used to perform at least one of disconnecting the second computing device from the network or deleting at least one copy of the network authentication information.

7. The computer implemented method of claim 4, further comprising:
  determining that a TTL value is expired;
  disconnecting access to the network; and
  deleting the network authentication information.

8. The computer implemented method of claim 4, further comprising:
  determining that the second computing device is permitted to share the network authentication information; and
  sharing, by the second computing device, the network authentication information with one or more computing devices.

9. The computer implemented method of claim 4, further comprising:
  receiving update information at the second computing device to update a TTL value.

10. The computer implemented method of claim 9, wherein the update information is sent in response to at least one event being detected, and wherein the at least one event includes at least one of making a purchase or maintaining a continuous connection with the network for at least a predetermined period of time.

11. The computer implemented method of claim 4, wherein the connection between the first computing device and the second computing device is a peer-to-peer network connection, and wherein the peer-to-peer network connection is based at least in part on one of a wi-fi direct peer-to-peer network connection, a Bluetooth peer-to-peer network connection, or a near field communication (NFC) peer-to-peer network connection.

12. The computer implemented method of claim 4, wherein the received network authentication information is encrypted.

13. The computer-implemented method of claim 4, wherein sending the network authentication information to the second computing device in response to the selection is based at least in part on a user of the second computing device checking into a hotel, checking into an airport, entering a particular building, or making a purchase.

14. A non-transitory computer readable storage medium storing one or more sequences of instructions executable by one or more processors to perform a set of operations comprising:
  detecting a second computing device within a vicinity of a first computing device;
  determining to provide network authentication information to the second computing device;
  establishing a connection by the first computing device with the second computing device; and
  transmitting the network authentication information to the second computing device, the network authentication information including a reshare preference, the reshare preference indicating that the second computing device is permitted to share the network authentication credentials with a predetermined number of other computing devices, wherein the network authentication information is used to authenticate the second computing device to a network, the second computing device configured to:
    connect to the network using the network authentication information,
    establish a peer-to-peer connection with at least one other guest computing device, and
    share the network work authentication information with the at least one other guest computing device based at least in part on the reshare preference.

15. The non-transitory computer readable storage medium of claim 14, further comprising instructions executable by the one or more processors to perform a set of operations comprising:
  receiving the network authentication information at the second computing device from the first computing device; and
  connecting to the network using the network authentication information.

16. The non-transitory computer readable storage medium of claim 14, wherein the connection between the first computing device and the second computing device is a peer-to-peer network connection, and wherein the peer-to-peer network connection is based at least in part on one of a wi-fi direct peer-to-peer network connection, a Bluetooth peer-to-peer network connection, or a near field communication (NFC) peer-to-peer network connection.

17. The non-transitory computer readable storage medium of claim 14, further comprising instructions executable by the one or more processors to perform a set of operations comprising:
  transmitting a time-to-live (TTL) value to the second computing device, wherein the TTL value indicates a maximum amount of time that the second computing device is permitted to access the network, and wherein the second computing device is configured to:
    determine that the TTL value is expired;
    disconnect access to the network; and
    delete the network authentication information from the second computing device.

18. The non-transitory computer readable storage medium of claim 14, wherein the first computing device includes a first system component and the second computing device includes a second system component, the first system component being used to perform at least one of sharing the network authentication information with the second system component on the second computing device, specifying at least one wireless network managed by the first computing device, specifying a TTL value, or specifying one or more reshare preferences, and wherein the second system component is used to perform at least one of disconnecting the second computing device from the network or deleting at least one copy of the network authentication information.

19. The non-transitory computer readable storage medium of claim 17, further comprising instructions executed by the one or more processors to perform the operations of:
   receiving update information at the second computing device to update a TTL value, the update information being sent in response to at least one event being detected, wherein the at least one event includes at least one of making a purchase or maintaining a continuous connection with the network.

\* \* \* \* \*